United States Patent [19]

Mutze et al.

[11] Patent Number: 5,276,534
[45] Date of Patent: Jan. 4, 1994

[54] OPTICAL APPARATUS FOR MAINTAINING A FOCUSSED IMAGE BY INTERCONNECTED ADJUSTMENT OF OBJECT AND IMAGE DISTANCES

[75] Inventors: Ulrich Mutze, Stuttgart; Meinrad Renner, Esslingen, both of Fed. Rep. of Germany

[73] Assignee: Eastman Kodak Company, Rochester, N.Y.

[21] Appl. No.: 659,336

[22] Filed: Mar. 7, 1991

[30] Foreign Application Priority Data

Jul. 8, 1989 [DE] Fed. Rep. of Germany ....... 3922512

[51] Int. Cl.$^5$ .............................................. H04N 1/04
[52] U.S. Cl. ..................... 358/487; 358/474; 358/497; 355/68
[58] Field of Search ............... 358/449, 451, 471, 474, 358/475, 483, 487, 494, 54, 55, 209, 213.19, 76, 497; 355/38, 68, 72, 77; H04N 1/393, 1/04

[56] References Cited

U.S. PATENT DOCUMENTS

| 4,580,172 | 4/1986 | Rajagopal . | |
|---|---|---|---|
| 4,633,306 | 12/1986 | Utsugi . | |
| 4,660,094 | 4/1987 | Yoshimoto et al. | 358/474 |
| 4,687,944 | 8/1987 | Mitsuka et al. | 358/474 |
| 4,707,743 | 11/1987 | Tokumitsu et al. | 358/209 |
| 4,771,473 | 9/1988 | Sugiura | 358/451 |
| 4,812,917 | 3/1989 | Suzuki . | |
| 5,012,354 | 4/1991 | Tsuchiya | 358/494 |
| 5,016,116 | 5/1991 | Maeshima | 358/451 |
| 5,140,443 | 8/1992 | Iwahara et al. | 358/494 |

FOREIGN PATENT DOCUMENTS

WO89/10036 10/1989 PCT Int'l Appl. .

OTHER PUBLICATIONS

"Kodak SU5000 Video Transfer Stand", Foto-contact Nov. 1987, cited on p. 1 of the specification.
"Slide on the move", Industrial Photography Feb. 1988, pp. 30-32, cited p. 1 of the specification.
International Search Report.

Primary Examiner—Edward L. Coles, Sr.
Assistant Examiner—Kim Y. Vu
Attorney, Agent, or Firm—David M. Woods

[57] ABSTRACT

In a device for converting into video signals the light signals from desired sections of a flat object such as a slide or a photographic print using a CCD-sensor (32), an optical system is provided which includes a lens unit (35) with a constant focal length. The optical system comprises at least two elements which are adjustable along the optical axis (30) and whose positions determine the image and the object distances for the imaging of the section of the object on the CCD-sensor (32). The two adjustable elements are connected by a gear mechanism (24) such that when the image and object distances are adjusted by the gear mechanism the lens unit (35) images the section of the object sharply on the CCD-sensor (32).

20 Claims, 9 Drawing Sheets

OPTICAL APPARATUS FOR MAINTAINING A FOCUSSED IMAGE BY INTERCONNECTED ADJUSTMENT OF OBJECT AND IMAGE DISTANCES

The invention relates to a device for converting light signals into video signals from desired sections of a flat object which extends substantially in an object plane, e.g. a slide or a photographic print.

Devices of that type comprising a housing, a first carrier for the object, a second carrier for a CCD-sensor for spot scanning the desired section and converting its information into video signals, and an optical system having a lens unit which is adjustable for imaging the desired section on the CCD-sensor and defines an optical axis are known, e.g. from the Kodak SV 500 Video-transfer Stand (see foto-contact 11/87, page 19) and the Fotovix film/videoprocessor of the Tamron company, which has been described in an article entitled "Slides on the move" in "Industrial Photography", February 1988, page 31. In the case of these known devices a zoom lens is used which allows enlargements of different sizes to be made when object sections of different sizes are to be imaged.

These known devices are relatively bulky and expensive.

It is the object of the invention to provide at low cost a device whose dimensions are as small as possible.

In a device having the aforementioned features, this object is attained in that the lens unit has a constant focal length, in that the optical system comprises at least two elements which are adjustable along the optical axis and whose position determines the image and the object distance, and in that both elements are connected by a gear mechanism such that the lens unit images the section of the object sharply on the CCD-sensor when the image and object distances have been adjusted by said gear mechanism.

Since a lens unit with a constant focal length is used the device can be produced with the same high optical quality as known devices, however at much lower cost and in a more space-saving manner. Moreover, the imaging quality so far reached by a zoom lens can be substantially improved by selection of a corresponding high-class lens unit.

According to an advantageous embodiment of the invention the lens carrier is fixedly arranged in the housing and the carriers of the object and the CCD-sensor are designed as movable carriages. This results in a particularly simple design of the gear mechanism which has the following features:

a cam portion connected with the object carriage and having a cam, a lever mounted for rotation in the housing, a first follower roller and a second follower roller which are mounted for rotation on the lever and of which the first engages the cam and the second the sensor carriage and a spring which biases said sensor carriage in a direction reducing the image distance and thus urges the sensor carriage into contact with the second follower roller and, via the lever, the first follower roller into contact with the cam. This can be attained by means of the spring either by a connection of the sensor carriage with the housing or of the sensor carriage with the object carriage.

The arrangement can be such that the cam portion is connected with the object carriage so as to be adjustable in its longitudinal direction and that for adjustment of the cam portion, a screw is provided as well as a recess for said screw in the end wall of the housing and that the screw projects from said recess when the object carriage is adjusted to the smallest object distance ($g_{min}$). It is thus possible for the gear mechanism to be adjusted according to the position of each object plane in such a manner that such an adjustment can only be made in the case of the maximum enlargement, and thus with maximum precision.

An advantageous constructional modification of the device according to the invention is characterized in that two guide rods are provided for the object carriage and the sensor carriage, said rods being arranged in parallel with the optical axis in the housing, that the object carriage comprises a mirror defining an angle of 45° with the optical axis to deflect said axis, and two parts connected with each other of which the upper part is arranged above a covering wall of the housing and the lower part is guided in the interior of the housing on the guide rods, that a turntable is mounted on the upper part of the object carriage and that the object holder forms a constructional unit with a lamp arranged above said holder, said unit being shiftable on said turntable in two vertical directions for deflecting the optical axis, and rotatable about said deflection.

The constructional unit may be designed as a grip portion for an operator. When the operator places his hand on the upper part of the object carriage and grips the constructional unit with his fingers, he can with one hand shift the carriage and the constructional unit, and any section desired may thus be imaged on the screen of a monitor controlled by the CCD-sensor.

The operator can also rotate the constructional unit with his fingers so that horizontal or vertical slides, for example, can always be imaged in an upright position by the CCD-sensor.

Instead of the carrier of the CCD-sensor and the carrier of the object carriage being designed as movable carriages which are adjustable by means of a gear mechanism for setting the image and object distances, the carrier of the CCD-sensor and/or the object carriage may, according to one embodiment of the invention, also be arranged so as to be not shiftable along the optical axis. In such a case an element, which is adjustable along the optical axis and connected with the gear mechanism, may be present within the raypath between the lens unit and the unshiftable carrier of the CCD-sensor and/or a mirror movably arranged within the raypath between said lens unit and the object carrier which is not shiftable along the optical axis, said mirror being movable by the gear mechanism such that image distance and object distance can be changed as desired by adjustment of said mirror.

The mirror used may be a roof mirror which has two optically cooperating reflecting surfaces including a right angle. This angular position of the surfaces allows the direction of the ray-path to be reversed by 180°, with an adjustment of the roof mirror along the optical axis either elongating or shortening said raypath.

If the object carrier is arranged so as to be not shiftable along the optical axis it is mounted on the housing such that for the purpose of aligning desired sections with the optical axis, said object is movably mounted in the plane vertical to said axis and preferably rotatable, for example, by means of a turntable.

A CCD-sensor which cannot be shifted along the optical axis is particularly advantageous if additional means are provided in the raypath directly in front of the sensor surface, which serve to influence the lightrays incident on said sensor surface. Such means may be a beam displacement unit which allows a beam to be displaced in a controlled manner along the plane of the sensor surface. In the case of a CCD-sensor in which the gaps between adjacent pixels represent nonsensitive areas, this offers an opportunity to proceed step by step when building up the video signals which reproduce the image information of the object such that as a result of the beam displacement light beams which correspond to the same image information are made to impinge on different locations of the sensor surface so that such image information as would impinge on a gap between pixels without beam displacement can also be used for generating a signal.

The beam displacement unit may consist of plane parallel optical flats which have different inclinations relative to the optical axis and can be selectively introduced into the raypath. The plane parallel flats may be mounted in a holder in the form of a wheel where they are held in recesses positioned concentrically with the axis of rotation thereof. When the wheel is rotated by means of an electric actuator the desired plane parallel flats can be moved into the raypath.

The additional means placed in front of the CCD-sensor in the raypath may also consist of a color filter wheel which allows in a manner known per se color video signals to be generated by means of a black-and-white sensitive CCD-sensor in that the color information of the object is scanned step by step with various color filters being moved into the raypath.

The device according to the invention is usable for any type of object, and in particular also for nontransparent pictures which can be imaged by means of the optical system on a sensor surface of the CCD-sensor.

In the following the invention will be described in detail with reference to embodiments shown schematically in the drawings wherein.

Figure 1:
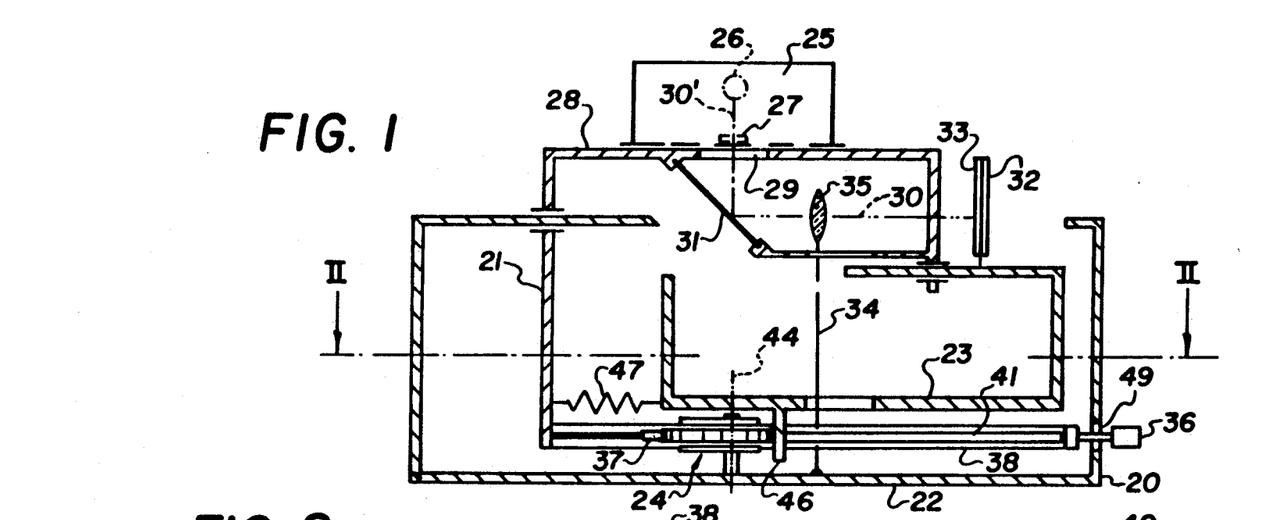
FIG. 1 shows a vertical longitudinal section along line I—I in FIG. 2 of a merely theoretical embodiment illustrating the principle underlying the invention.
Figure 2:
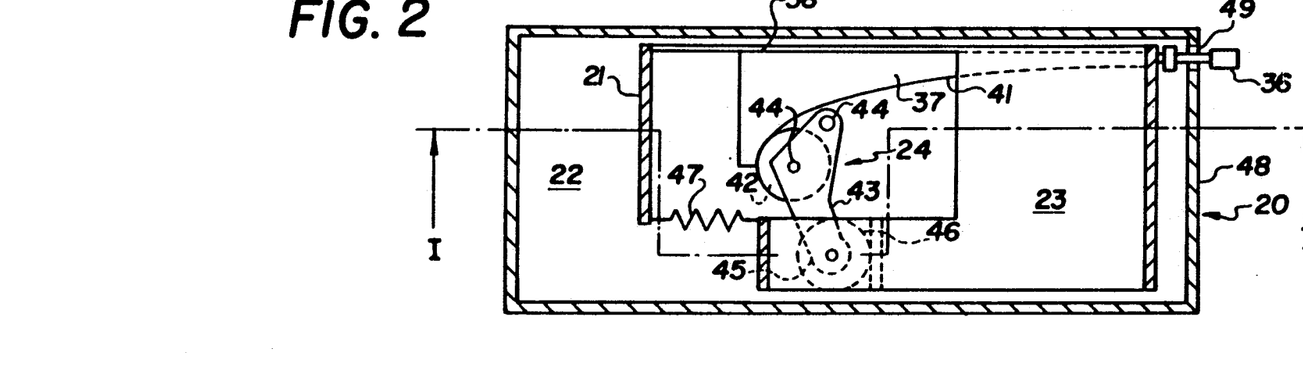
FIG. 2 shows a section along II—II in FIG. 1.

The schematic illustration according to FIGS. 1 and 2 shows a merely theoretical embodiment of a device for converting into video signals the light signals from desired sections of a flat object such as a slide. The device comprises a housing 20 in which an object carriage 21 serving as an object carrier is mounted so as to be shiftable in the plane of the drawing and parallel with the bottom 22 of the housing 20, i.e. in the longitudinal direction thereof. Also shiftable in the same direction is a sensor carriage 23 which is displaceable relative to the object carriage 21 and connected therewith. A gear mechanism generally denoted 24 is provided between the two carriages.

A constructional unit 25 is arranged on the object carriage 21.

The constructional unit is shiftable on the object carriage in two directions vertical to each other in a horizontal plane and is connected with the object carriage 21 for rotation about an axis perpendicular to bottom 22. The constructional unit 25 houses a lamp 26 and a holder 27 for an object to be imaged such as a slide. The upper wall 28 of object carriage 21 includes an opening 29 below which a mirror 31 is fixedly arranged in the object carriage 21, the plane of said mirror extending vertically to the plane of the drawing and at an angle of 45° to the vertical. On the sensor carriage 23, a CCD-sensor 32 is arranged such that the light of lamp 26 after having passed through the slide arranged in holder 27 and having been reflected by mirror 31 impinges on the sensor surface 33. In the path of the light beam falling from mirror 31 onto sensor surface 33, a lens unit 35 is arranged on a carrier 34, said lens unit defining a horizontal optical axis 30 which is vertically deflected by mirror 31 to form a deflection path 30'. The carrier 34 is fixedly connected with housing 20.

Gear mechanism 24 which connects the object carriage 21 with sensor carriage 23 comprises a cam portion 37 which is connected with object carriage 21 so as to be shiftable in a dovetail guide 38 thereof, parallely with the plane of the illustration in FIG. 2. A knurled head screw 36 is provided for displacing cam portion 37 relative to the object carriage 21 and for sharply focussing the optical system thereby.

Cam portion 37 features a cam 41 which is engaged by a follower roller 42 mounted for rotation on a lever 43 which is pivotable about a journal 44 fixedly arranged on housing bottom 22 and carries at its outermost end a second follower roller 45 also mounted for rotation on lever 43.

The second follower roller 45 rests against a lower projection 46 of sensor carriage 23 which is connected with the object carriage 21 by means of a tension spring 47 by which projection 46 is urged into contact with the second follower roller 45 and cam 41 is urged in the opposite direction into contact with the first follower roller 42. Gear mechanism 24 thus determines the position of object carriage 21 relative to sensor carriage 23; for when the object carriage 21 is moved horizontally towards the left in the plane of the illustration according to FIG. 1, the follower roller 42 follows cam 41 and pivots lever 43 clockwise so that, under the action of spring 47, the sensor carriage 23 follows the pivotal movement of the lever. As a result of this movement of object carriage 21, which is directed towards the left in the illustrations according to FIGS. 1 and 2, the object distance g of the slide held in holder 27 from the corresponding chief plane of lens unit 35 is increased whereas the image distance b of sensor surface 33 from the corresponding chief plane of lens unit 35 is reduced. Cam 41 is designed such that when the focal length f of lens unit 35 is for example equal on either side, Abbe's law of imagery $$1/b + 1/g = 1/f$$

is fulfilled.

As can be seen from FIG. 2, a recess 49 is provided for screw 36 in the right end wall 48 of housing 20, screw 36 fully projecting from said recess when the object carriage 21 is in its outermost righthand position, as seen in FIGS. 1 and 2, in which the object distance $g_{min}$ has its smallest value. In that position the greatest enlargement of the scene on the slide is imaged in the plane of the sensor surface 33, and the image produced by the CCD-sensor on a monitor can be sharply focussed by rotation of screw 36. Such focussing is necessary in particular because the device is to be usable for slides both mounted in glass and those not mounted in glass.

Screw 36 serves to compensate for changes in the object distance caused by the thickness of the glass.

On the basis of the above law of imagery the dependence of the image distance on the object distance can be determined if the focal length f is chosen as a unit of length so that $$b = g/(g-1)$$

is obtained.

The enlargement factor of the above-described optical system results from the formula linear image distance / linear object distance b/g
= $\beta$.

The height of the sensor surface is 1/6 of the height of the slide. If the focal length of the lens unit f=1 is used as unit of length a slide is imaged on the total sensor surface at an object distance of g=7 because the image distance will then be b=7/6 and, consequently the factor of enlargement will be $\beta = 1/6$.

The monitor controlled by the sensor will then show the full slide image. This type of display will be referred to in the following as enlargement 1 : 1 with an enlargement factor gamma = $6 \times \beta$.

Figure 3:
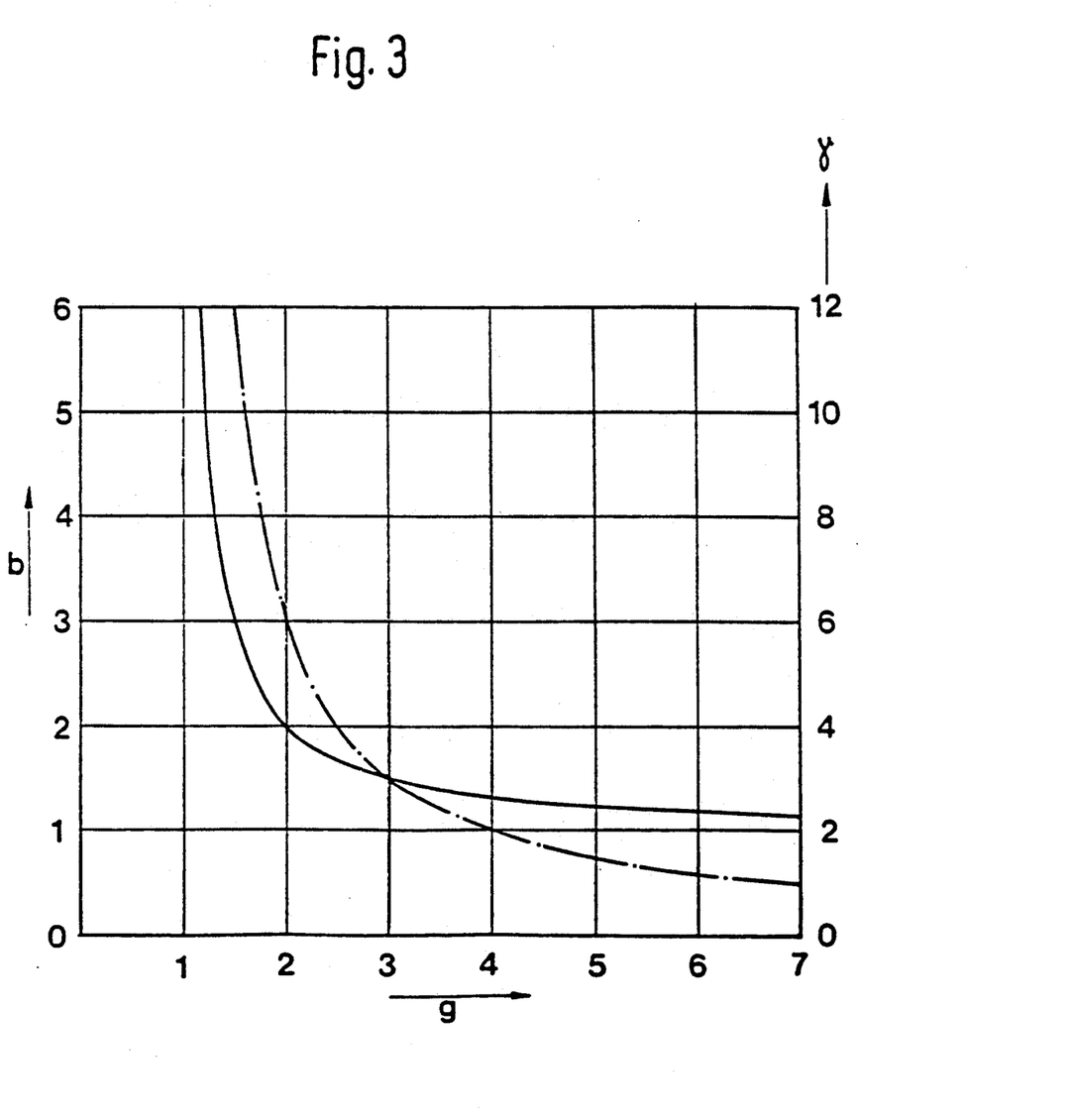
FIG. 3 shows a graph in which the image distance b and the enlargement gamma are plotted as abscissae against the object distance g, with the focal length of the lens unit being chosen as a unit of length.

The following table lists the image distance b and the enlargement gamma as a function of the object distance g if f=1:

| g | b | gamma |
|---|---|---|
| 1.5 | 3 | 12 |
| 2 | 2 | 6 |
| 3 | 3/2 = 1.5 | 3 |
| 4 | 4/3 = 1.33 | 2 |
| 5 | 5/4 = 1.25 | 1.5 |
| 6 | 6/5 = 1.2 | 1.2 |
| 7 | 7/6 = 1.17 | 1 |

FIG. 3 shows a graph in which the relationship of the image distance b and the enlargement gamma (indicated by the Greek letter in the graph) is represented by the full-line curve and the dash-dotted curve respectively.

The mode of operation of the above-described theoretical embodiment is extremely simple. After the focus has been adjusted to the smallest object distance $g_{min}$ the object carriage 21 is moved to the left to enlargement gamma =1. Subsequently the constructional unit 25 is shifted and rotated such that the desired section is located in the middle of the screen of the monitor whereupon the object carriage is shifted to the right in the illustration according to FIGS. 1 and 2 and the object distance is thus reduced until the whole section desired completely fills the screen of the monitor in its enlarged form.

In the embodiment described in the following with reference to FIGS. 4 to 12, those parts which functionally correspond to the parts illustrated in FIGS. 1 and 2 bear reference numerals which are each increased by 100 so that when the following embodiment is described, reference is made to the description of the preceding embodiment and unneccessary repetitions are avoided.

Figure 4:
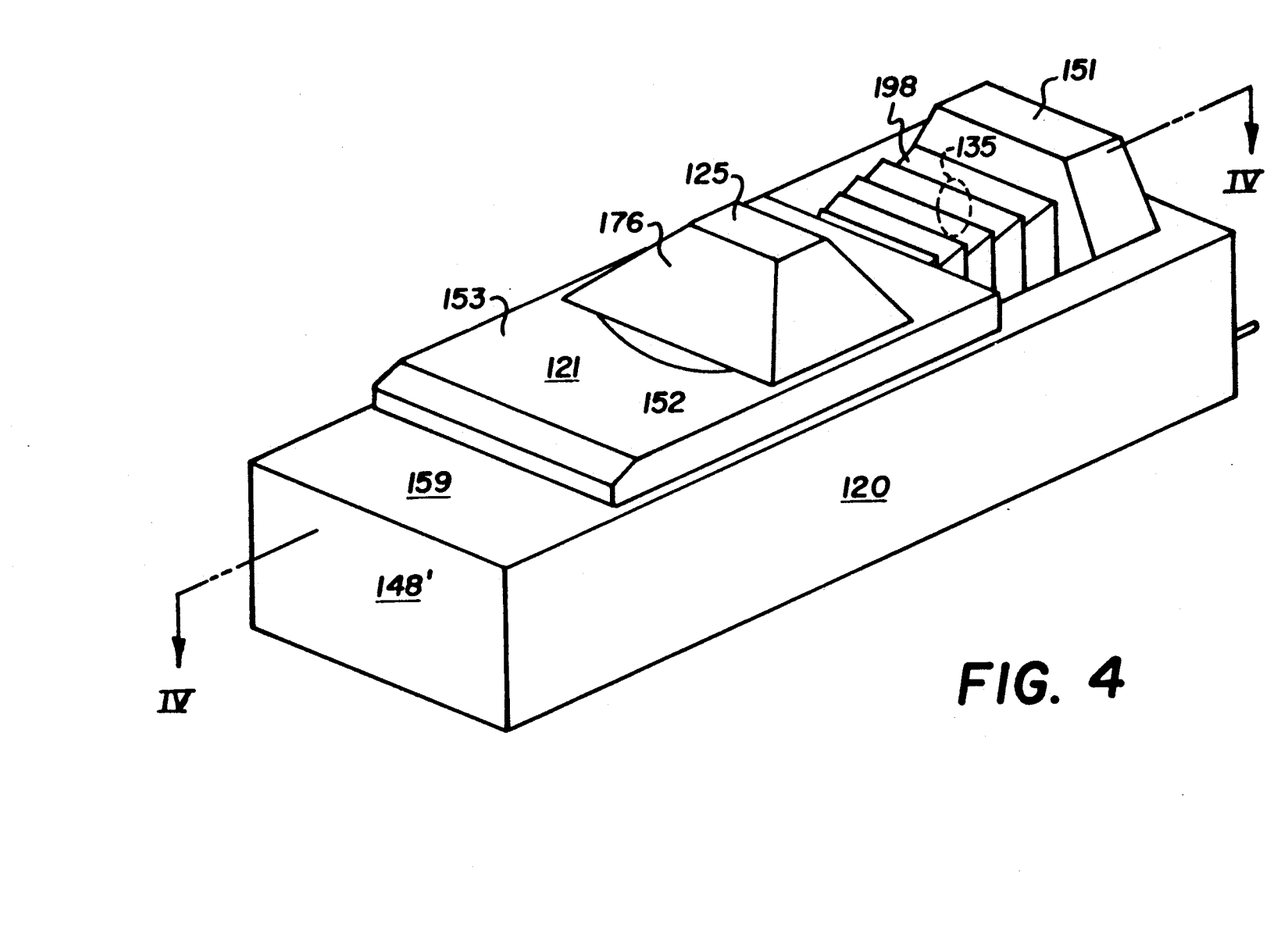
FIG. 4 shows a greatly simplified perspective view of an actual, second embodiment.

FIG. 4 shows schematically such parts of the device as are visible from outside, namely housing 120, object carriage 121 and electronic unit 151 which is positioned on the sensor carriage 123 not visible in FIG. 4 (but visible in FIG. 5) and carries the CCD-sensor also not illustrated and in which the light signals received by the CCD-sensor are converted into video signals. FIG. 4 moreover shows the constructional unit 125 which is arranged on the object carriage and is mounted on said carriage so as to be shiftable in two directions vertical to each other and rotatable by means of a turntable 152. In the space between mirror 131 and electronic unit 151, which is covered by bellows 198, lens unit 135, which is only sketched in FIG. 4, is fixedly arranged in the housing, said lens unit defining the optical axis 130 and its deflected path 130'.

In this embodiment, the object carriage generally denoted 121 comprises an upper portion 153 and and a lower portion 154 (FIG. 5), which are connected to form a compact unit which has two slots 155 extending horizontally on either side and, on its upper side, a round opening 156 for the turntable 152 (FIGS. 10-12), which is rotatable about an axis of rotation represented by the deflection path 130', as well as a recess 157 for the mirror 131 and the light beam emanating from lamp 126 (FIG. 12) and reflected by mirror 131.

In the lower portion 154 of object carriage 121, a bore 158 is provided below each of the two slots 155, said bores serving to guide the object carriage 121 on two parallel rods 159 (of cylindrical design in the case of the illustrated embodiment), which are attached to the end walls 148 and 148' (FIG. 4) and extend parallelly with the optical axis 130. Housing 120 has an upper covering wall 160 which is provided with a cut-out 161 extending along the optical axis (FIGS. 5 and 7) and adapted for receiving the carriage part which connects the two carriage portions 153 and 154. As can be seen from FIG. 5, the upper portion 153 extends further towards the end wall 148' (FIG. 4) (the back end wall according to FIG. 5) of housing 120 than the lower portion 154, the difference being such that the upper portion fully covers the cut-out 161 in the foremost position of the object carriage 121 and that the object carriage 121 can nevertheless be shifted up to the maximum object distance.

Figure 7:
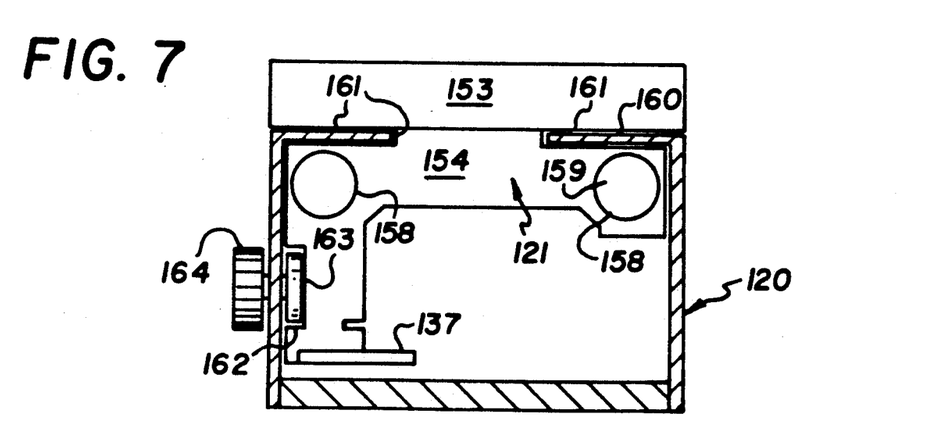
FIG. 7 shows a view of the object carriage seen in the direction of the arrow VII in FIG. 5, with the housing illustrated in section.

As schematically illustrated in FIG. 7, a rack 162 is provided for shifting carriage 121 in the axial direction, said rack meshing with a pinion 163 which can be operated by knurled wheel 164 located outside housing 120 so that the object carriage 121 can be held in a self-locking manner by the rack-and-pinion drive and can always be adjusted to the desired object distance, and thus the desired enlargement, by rotation of said wheel.

Figure 10:
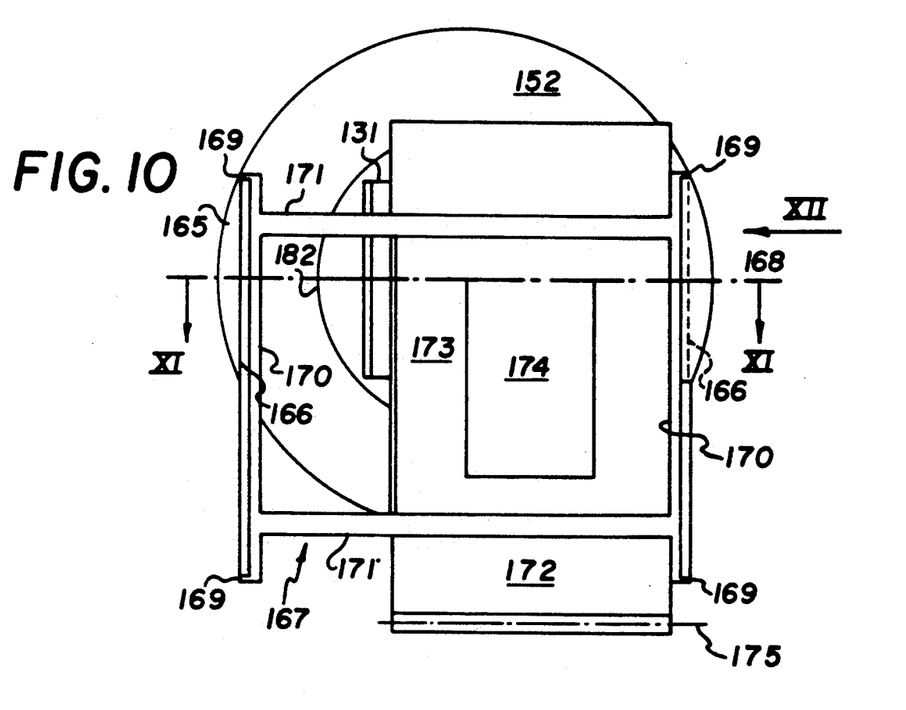
FIG. 10 shows a plan view of the two carriages for the object holder, which are mounted for rotation on the object carriage by means of a turntable.
Figure 11:
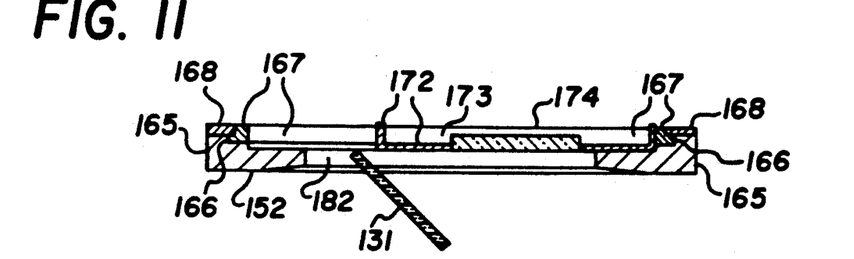
FIGS. 11 and 12 show a sectional view along lines XI—XI and a lateral view seen in the direction of the arrow XII in FIG. 10 respectively.
Figure 12:
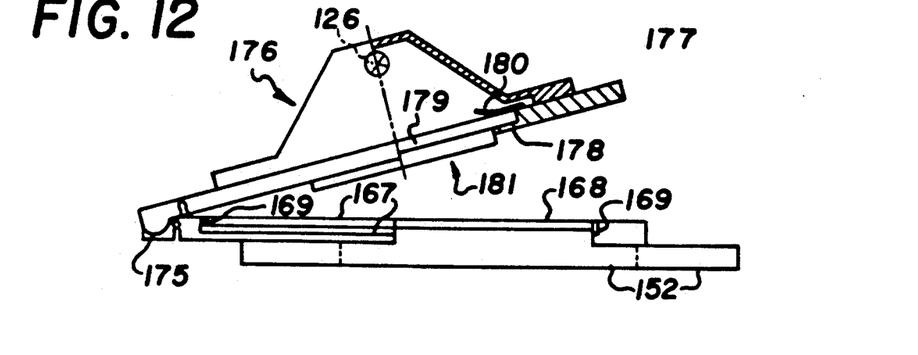

The constructional unit 125 which is mounted on object carriage 121 is illustrated in detail in FIGS. 10 to 12. The turntable 152 is provided at two diametrically opposed points with upright segment-shaped projections 165 whose facing surfaces form straight guide surfaces 166 for two guide rods 170 of a first carriage 167. Similarly segment-shaped holding plates 168 are fixed on the projections 165 by screws or the like to prevent the first carriage 167 from being separated from turntable 152. In FIG. 10, the holding plate 168 is omitted on the left side in order to facilitate understanding of the illustration. Abutments 169 on either side, which are formed by projections at the ends of the guide rods 170, limit the shifting movement of the first carriage 167 on turntable 152.

The first carriage 167 comprises two parallel guide rails 171 for a second carriage 172, said guide rails being perpendicular to the guide surfaces 166. The second carriage 172 serves as a holder for the slide (not illustrated), which is to be imaged on the monitor, and comprises for this purpose a glass plate 174 surrounded by a rectangular frame 173, as seen from above, for positioning the slide film or the glass plate used for mounting said slide film. A lid generally denoted 176 is pivotably connected with the second carriage 172 by means of a hinge 175. The lid is omitted in FIGS. 10 and 11 and only illustrated in FIGS. 4 and 12. In FIG. 12, it is shown in section on the right side. Lid 176 comprises a bottom plate 177 which is provided with a recess 178 for receiving the flange type edge 179 of a glass plate 181 which is resiliently held in recess 178 by springs 180 acting on edge 179.

A lamp 126 is arranged in lid 176 above glass plate 181. The glass plate 181 cooperates with glass plate 174 to press the slide film into a plane position when lid 176 has been pivoted from its raised position shown in FIG. 12 to its lower position on the second carriage 172.

As can be seen from FIG. 10 the second carriage 172 is shiftable between the two guide rods 170 in the first carriage 167. The first carriage 167 is in turn shiftable together with the second carriage vertically to the direction of shifting of the latter in the area limited by the abutments 169. Turntable 152 includes a recess through which the light emanating from lamp 156 and falling through glass plate 174 can impinge on mirror 131.

Figure 5:
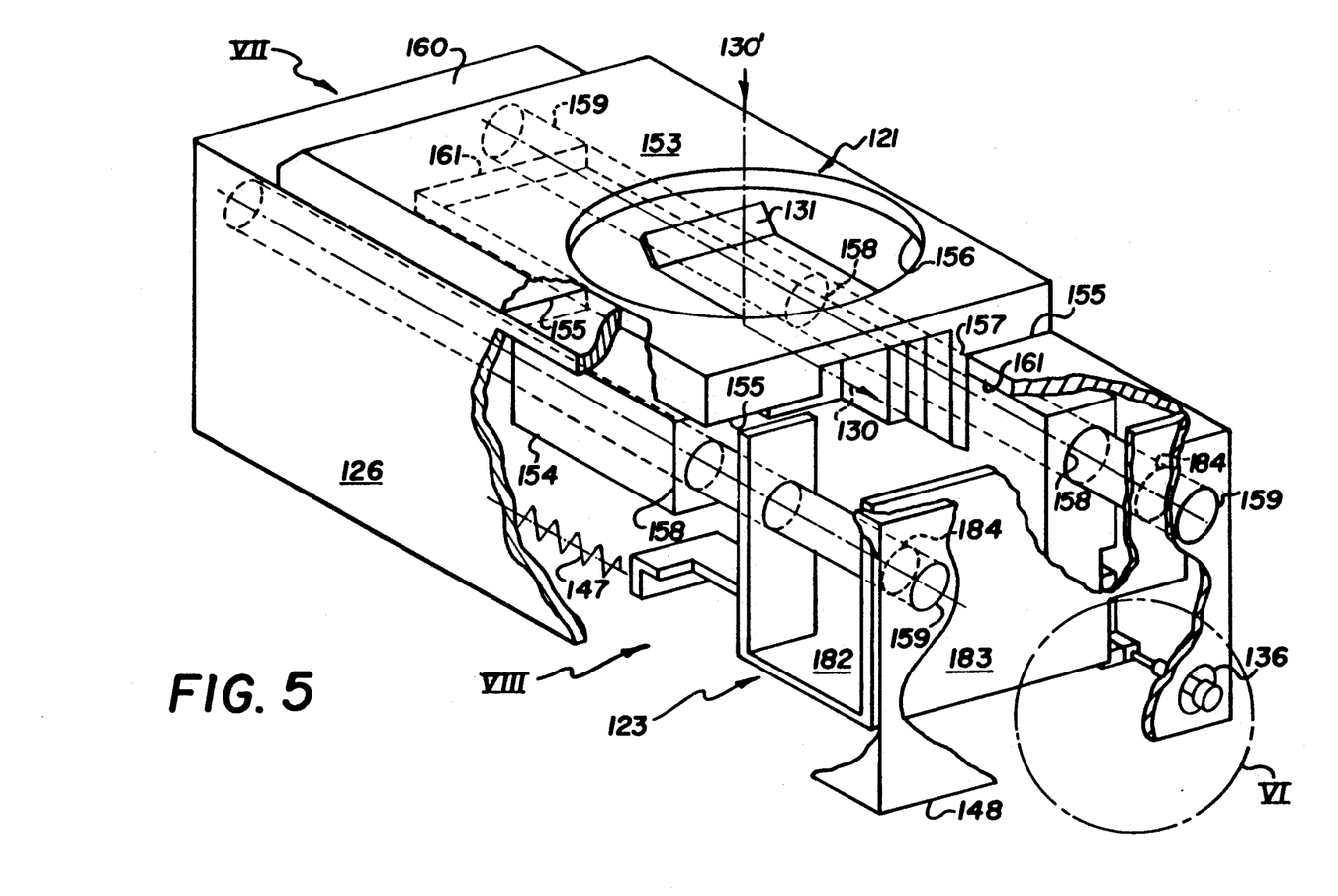
FIG. 5 shows a perspective view, with parts broken away, of the object carriage and the sensor carriage within the housing of the second embodiment according to FIG. 4.
Figure 8:
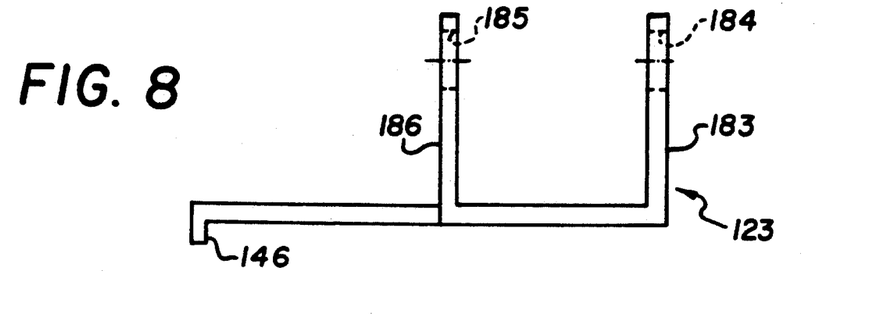
FIGS. 8 and 9 show a lateral view seen in the direction of the arrow VIII in FIG. 5 and a plan view of the sensor carriage respectively.
Figure 9:
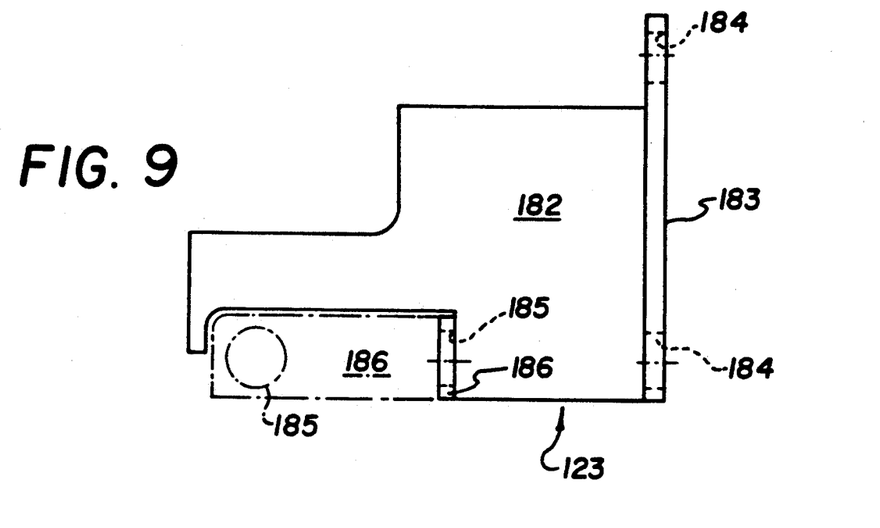

As illustrated in FIGS. 8 and 9, the sensor carriage 123 consists of a sheet-metal plate 182 whose edge 183, as shown on the right sides of FIGS. 8 and 9, is bent upwardly and provided with two guide holes 184 which receive the guide rods 159 (see FIG. 5). A third guide hole 185 is provided in that a substantially rectangular strip, shown in dash-dotted lines in FIG. 9, is cut out of plate 182 and bent upwardly, as can be seen in FIG. 8. The narrow strip 186 of plate 182 adjacent to the cutout is bent downwardly, as can be seen from FIG. 8, and forms a projection 146 adapted for engagement with the second follower roller 145. The electronic unit 151 (FIG. 4), is arranged on sensor carriage 123 such that the light beam arriving from the slide and reflected by mirror 131 falls through lens unit 135 (FIG. 4), which is not illustrated in FIG. 5, onto the sensor surface of the CCD-sensor.

For the sake of clarity FIG. 5 only shows the object carriage 121 and the sensor carriage 123. The arrangement of the sensor surface of the CCD-sensor and the arrangement of the lens unit are clearly inferrable from FIGS. 1 and 2 (see reference numeral 32 and 35 resp.). In any case in this embodiment, too, the lens unit is fixedly arranged relative to housing 120 in the raypath between mirror 131 movable together with the object carriage and the sensor surface movable along with the sensor carriage, and is mounted, e.g. on the rods 159.

The object carriage 121 and the sensor carriage 123 are connected with each other by the same gear mechanism 24 as the object carriage 21 and the sensor carriage 23 of the theoretical embodiment according to FIGS. 1 and 2.

Figure 6:
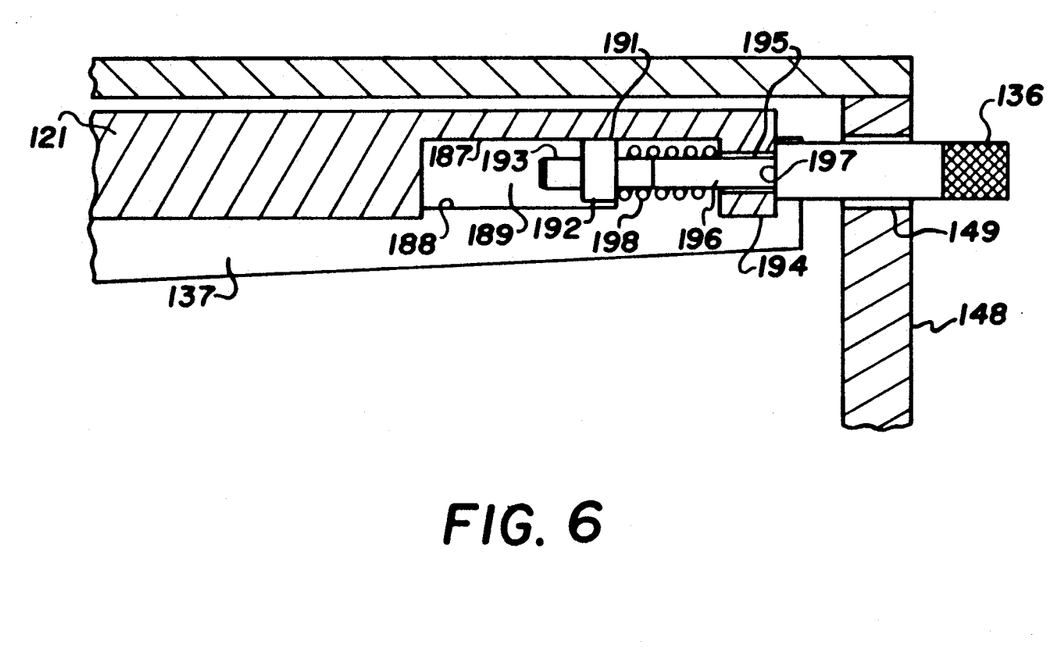
FIG. 6 shows a detail designated VI in FIG. 5.

The connection of knurled head screw 136 with cam portion 137 is illustrated in FIG. 6. The cam portion is held in object carriage 121 so as to be longitudinally shiftable in a dovetail groove. It is advantageous if the guide for the cam portion 137 which in this embodiment takes the form of a dovetail groove, is separately designed on housing 120 and only serves for shiftably mounting cam portion 131 in a precise manner, i.e. if it is independent of the guide means by which the object carriage 121 is movable in the longitudinal direction (rods 159). In such a case the guide means for object carriage 121 need not be designed as accurately as this is required for the guiding of the cam portion 137. In the case of embodiments of this type the object carriage 121 is connected with cam portion 137 by a coupling member, for example a toggle joint. Cam portion 137 comprises an opening 188 which is congruent with an opening 187 at the front end of the object carriage 121 adjacent to end wall 148. The material in which said opening 188 is provided is bent upwardly to form a flange 191 in which a tap-hole 192 is located which is held in engagement with the thread 193 of the knurled head screw 136.

The end wall 194 of the object carriage 121 which limits the opening 187 includes a bore 195 through which passes the threaded shaft 196 which terminates, via a shoulder 197, in the grip portion of the knurled head screw 136, said grip portion extending through the recess 149 of housing end wall 148 when the optical system is adjusted to maximum enlargement. Between flange 191 and end wall 194, a compression spring 198 surrounds the threaded shaft 196, to keep the cam portion in an accurately defined position by contact of shoulder 197 with the end wall 194.

Hence when the knurled head screw 136 is rotated the cam portion can be shifted in its longitudinal direction relative to the object carriage 121 and the optical system of the device focussed as a result of the gear mechanism 24 provided between object carriage 121 and sensor carriage 123.

As schematically illustrated in FIG. 4, the space between object carriage 121 and the electronic unit 151 is covered by bellows 198. In the case of the embodiment according to FIGS. 4 to 12, the tension spring 147 (FIG. 5) of the gear mechanism 24 connecting the two carriages 121 and 123 is tensioned between the sensor carriage 123 and the rear end wall 148' of housing 120. Due to a self-locking effect of the rack-and-pinion drive 162, 163, 164, the sensor carriage 123 is pulled by spring 147 in the direction towards the object carriage.

The mode of operation of the embodiment illustrated in FIGS. 4 to 12 is the same as that of the embodiment illustrated in FIGS. 1 to 3. The design chosen in the embodiment according to FIGS. 4 to 12 ensures a particularly simple operation of the device. The operator grips the object carriage 121 from above with one hand and using two fingers such as his thumb and index-finger seizes lid 176. By shifting the object carriage 121 the desired enlargement can be chosen and by shifting and rotating lid 176 the desired section of the slide can be selected. In order to exchange the slide just viewed, the lid 176 need only be pivoted upwardly about hinge 175.

Instead of using guide rails and guide carriages shiftable thereon to guide the object carrier 172, which is movable by lid 176, by means of for movement relative to the housing 120 in the longitudinal direction and in a transverse direction vertically thereto, the object carrier 172 might also be connected with the object carriage by a double parallelogram guide arrangement, with the object holder being movably guided in a manner similar to that of the ruler head of a drafting machine.

In the case of the two embodiments illustrated, the lens unit 35 is fixedly connected with the housing 20 and 120. In order that various enlargements can be set the object carriage 21 and 121 and the sensor carriage 23 and 123 are always adjustable relative to each other such that the desired section of the slide is sharply focussed on the sensor surface 33. The idea underlying the invention, however, can also be put into practice in that the object, e.g. the slide and/or the sensor surface 33 are stationarily arranged with respect to housing 20 and 120 respectively and the other parts which are adjustable along the optical axis are connected with each other according to the known mathematical relationship by a gear mechanism.

Figure 13:
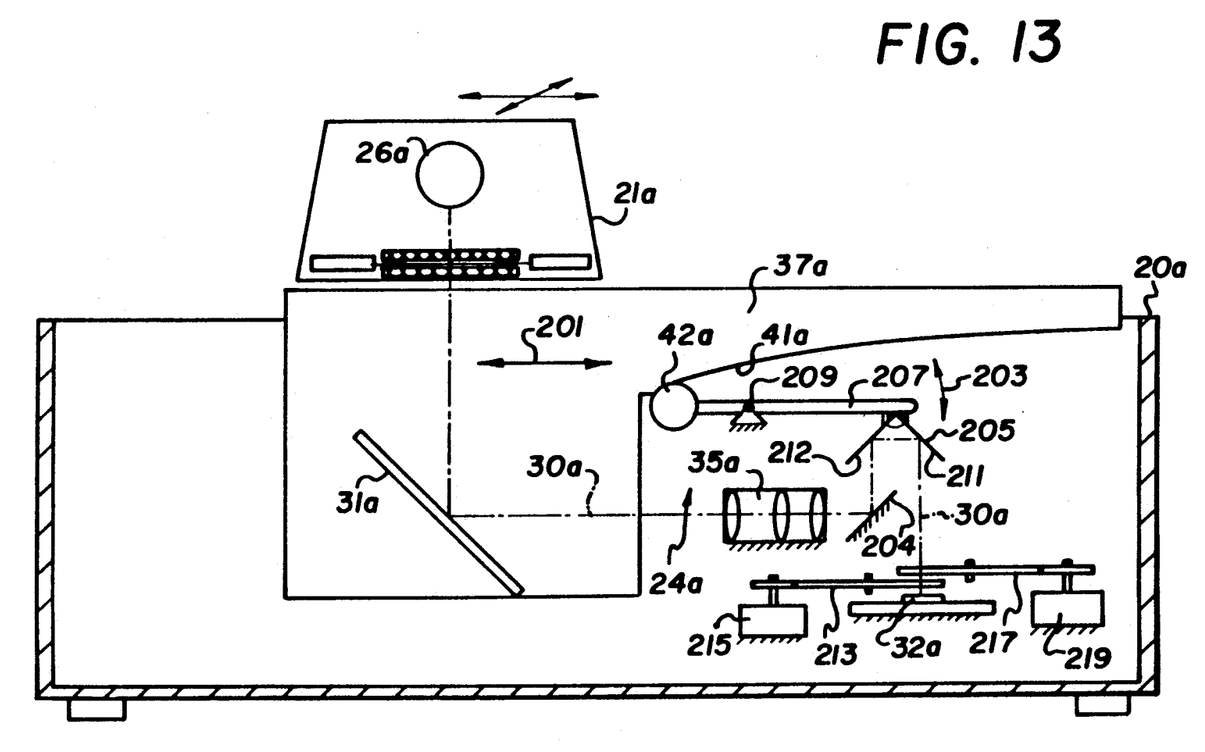
FIGS. 13 and 14 show greatly simplified lateral views of two further embodiments open along vertical sectional planes.
Figure 14:
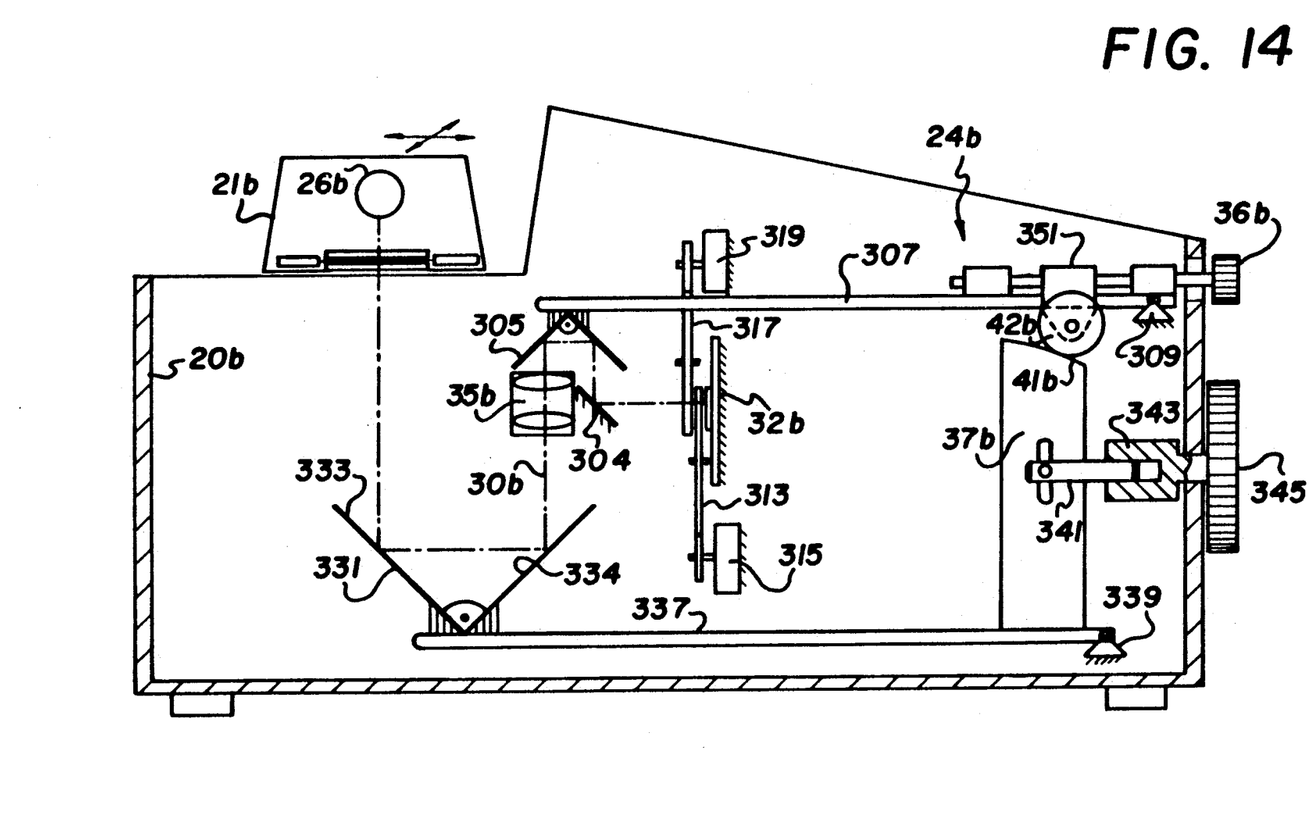

Two examples of such embodiments are shown in FIGS. 13 and 14, schematical illustrations, which only serve to explain the functional principle and which do not include details that are obvious to a person skilled in the art. Those parts which functionally correspond to parts illustrated in the embodiment according to FIGS. 1 and 2 have the same numerals to which, however, an a and b respectively has been added so that by using such reference numerals, reference is made to the aforedescribed embodiment and unnecessary repetitions are avoided.

In the example according to FIG. 13 the object carriage 21a is longitudinally movable relative to housing 20a in the same manner as the object carriage 21 of the example first described. Also a means (turntable) is provided for rotating the object carriage in the same way as in the aforedescribed examples.

When the object carriage 21a is shifted in its longitudinal direction cam portion 37a is entrained in its direction of guidance which is indicated by a double arrow 201. During such movement of object carriage 21a and cam portion 37a relative to housing 20a and relative to the fixedly mounted lens unit 35a the object distance is changed. The image distance is correspondingly adjusted with the assistance of the gear mechanism 24a via a roof mirror 205 which is arranged in the raypath between lens unit 35a and a fixedly arranged deflecting mirror 204 positioned in front of CCD-sensor 32a and adjustable by means of the gear mechanism 24a in the direction of a double arrow 203. Roof mirror 205 is stationarily mounted in the end section of a two-arm pivotal lever 207 which is pivotably mounted at 209 on housing 20a and carries in its end section opposite to roof mirror 205 a rotatable follower roller 42a which, under the influence of the weight of the other lever arm which is substantially longer and carries the roof mirror 205, is urged into contact with cam 41a of cam portion 37a. When the follower roller 42a moves along cam 41a the roof mirror 205 is adjusted in the direction of the double arrow 203 as was mentioned before, which causes a corresponding change in the image distance.

In spite of the relatively great length of the arm of lever 207 which carries the roof mirror 205, the position of the roof mirror 205 is not rectilinearly adjusted along the optical axis 30a but along a slightly arcuate path. Since the two cooperating reflecting surfaces 211 and 212 of roof mirror 205 include a right angle the slight pivotal movement of roof mirror 205 does not change the angular position of the optical axis 30a but only causes a slight lateral displacement of the beam, i.e. a displacement of the position of the section of the scene imaged on sensor 32a. This may be compensated if necessary by an adjustment of the object carriage 21a by which the section is changed.

As in the case of the embodiment described at the beginning where the cam portion 37 and the object carriage 21 can be adjusted relative to each other for sharp focussing by means of screw 36, the example of FIG. 13 also includes adjustment means for this purpose which are not illustrated.

As was mentioned before, the basic difference between the example according to FIG. 13 and the example described at the beginning consists in that the CCD-sensor 32a is fixedly connected with the housing 20a. This fixed arrangement is particularly advantageous if additional means are optically arranged in front of sensor 32a. In the example illustrated such means consist of a rotatably mounted color filter disk 213 which is rotatable by means of an actuator 215 by which the desired color filter areas of the disk 213 can be successively aligned with the optical axis 30a. In a manner known per se a color video signal can thus be generated using a black-and-white sensitive sensor 32a.

A further accessory means is a wheel 217 which is mounted for rotation in a manner similar to the color filter disk 213 and can be indexed by an actuator 219. The wheel 217 comprises plane parallel optical flats located in recesses concentrical with its axis of rotation, of which one desired plane parallel flat at a time can be aligned with the optical axis 30a. The plane parallel flats have different inclinations relative to the optical axis 30a so that the wheel 217 with its plane parallel flats forms a controllable optical beam displacement unit by means of which the video signal can be built up in several steps. By selecting the rotary position of the wheel 217 a beam displacement can be effected during each step such that image information which without such beam displacement would fall into the inactive gaps between adjacent pixels of the sensor 32a reaches the sensitive area of the pixel concerned and is not lost for image signal generation.

Like the example according to FIG. 13, the example according to FIG. 14 also features a fixed arrangement of the CCD-sensor 32b relative to housing 20b. Moreover the same accessory means as described above are placed in an optically effective manner in front of sensor 32b, namely a color filter wheel 313 with an actuator 315 and a wheel 317 which serves as a beam displacement unit and carries plane parallel optical flats, and which can be indexed by an actuator 319.

As in the case of the example according to FIG. 13, a roof mirror 305 is provided in the raypath between the lens unit 35b and a deflecting mirror 304 fixedly arranged in front of sensor 32b, said roof mirror being adjustable by means of the gear mechanism 24b along the optical axis 30b. The roof mirror 305 is located in the end section of a single-arm pivotal lever 307 which is pivotable about a journal 309 and whose position can be adjusted via a follower roller 42b guided under the influence of the weight of lever 307 on a cam 42b of a cam portion 37b so that the roof mirror 305 can be adjusted for changing the image distance by means of the gear mechanism 24b formed by the follower roller 42b and the cam 41b.

In contrast to the example according to FIG. 13 the cam portion 37b is not moved in that the object carriage 21b is shifted in the longitudinal direction but the object carriage 21b is not coupled with the cam portion 37b. Therefore in the case of this embodiment, the object carriage 21b does not represent an element which can be adjusted along the optical axis 30b for changing the object distance. For that purpose, a second roof mirror 331 is provided which has two reflecting surfaces 333 and 334 including a right angle and which is fixedly mounted to the end section of a second pivotal lever 337. The second roof mirror 331 is moved for adjustment of the object distance in that the position of the pivotal lever 337 about its journal 339 is changed by means of a threaded spindle 341 hinged to cam portion 37b which in turn is fixedly connected with lever 337. The threaded spindle 341 is held in engagement with an adjusting nut 343 which is rotatable by a knob 345.

When the cam portion 37b is pivoted about journal 339, follower roller 42b moves along cam 41b, which causes roof mirror 305 to carry out a movement which in relation to the second roof mirror 331 is such that it fulfills the imaging equation. In order that the roof mirror 305 can be adjusted relative to the second roof mirror 331 for sharp focussing, the follower roller 42b is not fixedly connected with pivotal lever 307 but mounted on a mounting block 351 which is adjustable along lever 307 by means of a setting screw 36b which functionally corresponds to screw 36 according to FIGS. 1 and 2.

If a non-transparent picture rather than a slide is illuminated the image can be reproduced in a similar manner on the CCD-sensor by means well within the normal capabilities of a person skilled in the art.

The above description and the drawing are confined to features which are essential for describing examples of the invention. Inasmuch as features are disclosed in the description and shown in the drawing but not mentioned in the claims such features also serve if necessary to define the subject matter of the invention.

We claim:

1. Optical apparatus for projecting an image of a desired section of a flat object upon an image sensor situated on an optical axis with respect to the object, said apparatus comprising:
    a fixed focus lens positioned at a fixed location on the optical axis to image the desired section of the object upon said image sensor;
    object distance control means for adjusting the optical path between the object and said fixed focus lens to thereby define an object distance;
    image distance control means for adjusting the optical path between said image sensor and said fixed focus lens to thereby define an image distance; and
    a gear mechanism for interconnecting said object distance control means and said image distance control means in order to mutually adjust the image and object distances by an amount that causes said fixed focus lens to maintain the desired section of the flat object sharply imaged on said image sensor as the image and object distances are changed.

2. Optical apparatus as claimed in claim 1 wherein said object distance control means is a movable carriage that supports the flat object on the optical axis so as to define the object distance.

3. Optical apparatus as claimed in claim 2 wherein said image distance control means is a movable carriage that supports said image sensor on the optical axis so as to define the image distance.

4. Optical apparatus as claimed in claim 3 wherein said gear mechanism includes a cam on one of said carriages, and a follower engaging the other of said carriages and biased against said cam to thereby interconnect said carriages.

5. Optical apparatus according to claim 1, wherein at least one of said distance control means comprises at least one plane parallel optical flat inclined with respect to to the direction of the optical axis and selectively movable into said axis by means of an actuator.

6. Optical apparatus according to claim 5, wherein said at least one of said distance control means comprises a plurality of plane parallel optical flats provided on a holder, which plane parallel optical flats are inclined at different angles and/or directions toward the direction of the optical axis and can be selected and introduced into the axis by means of the actuator.

7. Optical apparatus according to claim 6, wherein said holder is a wheel which carries the plane parallel flats in recesses arranged concentrically with its axis of rotation and in which said plane parallel optical flats are rotatable into the desired rotary positions by means of the actuator.

8. Optical apparatus for projecting an image of a desired section of a flat object upon an image sensor situated on a optical axis with respect to the object, said apparatus comprising:
    a fixed focus lens positioned on the optical axis to image the desired section of the object upon said image sensor;
    a movable sensor carrier for supporting said image sensor along the optical axis to thereby define a variable image distance;
    a movable object carrier for supporting said flat object along the optical axis to thereby define a variable object distance;
    a gear mechanism that interconnects with said movable sensor carrier and said movable object carrier to adjust the image an object distances whenever one of said carriers is moved, said gear mechanism causing the fixed focus lens to maintain the desired section of the flat object sharply imaged on said sensor as the image and object distances are adjusted.

9. Optical apparatus according to claim 8 wherein said fixed focus lens is fixedly mounted to a housing that generally contains said optical apparatus.

10. Optical apparats according to claim 9, wherein said object carrier is movably mounted on said housing and connected with said gear mechanism.

11. Optical apparatus according to claim 9 wherein said sensor carrier is movably mounted on the housing and connected with the gear mechanism.

12. Optical apparatus according to claim 8, wherein at least one of said carriers includes a mirror which is movably arranged in the optical axis.

13. Optical apparatus according to claim 9, wherein said object and sensor carriers comprise respective object and sensor carriages that are movable relative to said housing along the optical axis.

14. Optical apparatus according to claim 13, wherein an object holder is provided which is connected with said object carriage so as to be adjustable relative to said object carriage in an object plane.

15. Optical apparatus according to claim 14, wherein said object holder comprises a second carriage which is movable in x-y directions on said object carriage.

16. Optical apparatus according to claim 14, wherein said object holder is arranged on a turntable which is rotatable about an axis perpendicular to the object plane.

17. Optical apparatus according to claim 9, wherein said gear mechanism is adjustable for sharp focussing of the desired section of the flat object upon said image sensor.

18. Optical apparatus according to claim 9, wherein said gear mechanism includes a cam which is arranged on one of said carriers, and which is movable relative to said housing, and at least one follower member arranged on the other of said carriers for mutual adjustment of the carriers along the optical axis.

19. Optical apparatus according to claim 18, wherein said cam is connected with said object carriage, and in that said gear mechanism further comprises:
- a lever mounted for rotation in said housing;
- a first follower roller and a second follower roller which are mounted for rotation on said lever, and of which said first roller engages said cam and said second roller engages said movable sensor carrier; and
- a spring which biases said movable sensor carrier in a direction reducing the image distance and thus urging said movable sensor carrier into contact with said second follower roller and, via said lever, urging said first follower roller into contact with said cam.

20. Optical apparatus according to claim 19, wherein said spring is tensioned between said housing and said movable sensor carrier.

* * * * *